United States Patent
Barnes et al.

(10) Patent No.: US 7,845,948 B2
(45) Date of Patent: Dec. 7, 2010

(54) TRAINING METHOD AND DEVICE FOR TEACHING A TRAINEE TO REMAIN WITHIN A SAFETY ZONE

(76) Inventors: Ricky Dion Barnes, 537-B Emmaus Church Rd., Dudley, NC (US) 28333; Randall Wade Rogers, 417 Arrington Bridge Rd., Goldsboro, NC (US) 27530

(*) Notice: Subject to any disclaimer, the term of this patent is extended or adjusted under 35 U.S.C. 154(b) by 270 days.

(21) Appl. No.: 10/705,312

(22) Filed: Nov. 10, 2003

(65) Prior Publication Data
US 2005/0100870 A1   May 12, 2005

(51) Int. Cl.
*G09B 19/00* (2006.01)

(52) U.S. Cl. .............................. 434/219; 434/21; 434/22

(58) Field of Classification Search ................ 434/226, 434/16, 19, 219, 243, 21–22; 119/712, 905, 119/721; 473/438, 422; 340/573.4, 600, 340/555–557; 356/3.01, 4.01, 4.08, 141.4, 356/141.2, 141.3, 145, 247; 109/21, 38, 109/340
See application file for complete search history.

(56) References Cited

U.S. PATENT DOCUMENTS

| | | | |
|---|---|---|---|
| 4,745,882 A * | 5/1988 | Yarnall et al. .............. 119/721 |
| 4,934,937 A * | 6/1990 | Judd ........................... 434/21 |
| 5,110,202 A * | 5/1992 | Dornbusch et al. ......... 356/3.12 |
| 5,226,818 A   | 7/1993 | Feiock et al. |
| 5,599,187 A * | 2/1997 | Mesiano ...................... 434/19 |
| 5,629,674 A   | 5/1997 | Fahrion |
| 5,660,549 A   | 8/1997 | Witt, III |
| 5,788,500 A * | 8/1998 | Gerber ......................... 434/22 |
| 5,822,870 A   | 10/1998 | King-Yang |
| 5,838,238 A * | 11/1998 | Abita et al. ............. 340/573.1 |
| 5,846,085 A   | 12/1998 | Witt, III |
| 5,903,345 A * | 5/1999 | Butler et al. ................ 356/247 |
| 6,127,926 A * | 10/2000 | Dando ........................ 340/541 |
| 6,208,260 B1* | 3/2001 | West et al. ............... 340/691.3 |
| 6,259,365 B1  | 7/2001 | Hagar et al. |
| 6,283,601 B1  | 9/2001 | Hagelin et al. |
| 6,317,043 B1  | 11/2001 | Berk |
| 6,323,773 B1* | 11/2001 | Runyon et al. ........... 340/573.1 |
| 6,358,164 B1* | 3/2002 | Bracewell et al. ........... 473/454 |
| 6,579,097 B1* | 6/2003 | Sampson et al. ............. 434/21 |
| 2001/0037186 A1 | 11/2001 | Kida et al. |
| 2002/0060639 A1 | 5/2002 | Harman |
| 2003/0156495 A1* | 8/2003 | Haase et al. ................. 367/119 |

OTHER PUBLICATIONS

FAS, Military Analysis Network; Multiple Integrated Laser Engagement System (MILES); 3 pgs.

* cited by examiner

*Primary Examiner*—Xuan M Thai
*Assistant Examiner*—Timothy Musselman
(74) *Attorney, Agent, or Firm*—Coats & Bennett, P.L.L.C.

(57) ABSTRACT

A method and device for training persons to remain within a safety zone. An emitter establishes a safety zone that is not to be exceeded by the person, and an adjuster may be operatively connected to the emitter to adjust the size and position of the safety zone. A sensor is placed away from the emitter to indicate when the person moves outside of the safety zone. The method comprises activating the emitter and positioning the person within the safety zone. When the person nears the signal or exits the safety zone, an alarm is indicated to the person and/or a facilitator. Upon return to the safety zone, the alarm may be deactivated and the training procedure within the safety zone can continue.

10 Claims, 6 Drawing Sheets

TRAINING METHOD AND DEVICE FOR TEACHING A TRAINEE TO REMAIN WITHIN A SAFETY ZONE

BACKGROUND

Military personnel, police officers, and others, generally referred to as trainees, are taught to remain low when involved in various situations. Their respective safety zones are at levels close to the ground or floor. Training devices and methods are needed to teach these individuals to stay within their safety zones and out of potential harm.

Military personnel and police officers have safety zones low to the floor where there is less chance that a bullet will strike them. Likewise, the safety zone for a firefighter is near the floor. When a fire starts within a structure, smoke and heat are created that rise and accumulate in the ceiling areas. During the early stages of the fire, the unsafe levels of smoke and heat remain at the upper levels of the structure. As the fire increases, the amount of smoke and heat increases pushing the unsafe levels to lower regions. As the fire continues, the smoke and heat increases until the entire structure is filled to unsafe levels.

Methods and devices for training are necessary so persons know how to respond when they are introduced into these environments. The training methods and devices should be effective to teach persons to remain in a low or crouched position when entering a potentially dangerous situation. This will re-enforce the importance of keeping themselves out of unsafe areas. The training method and device should be adaptable to cover a variety of vertical and horizontal safety zones. Additionally, the training method and device should also be adaptable to teaching other unsafe areas and zones that may be at various orientations including perpendicular to a floor, at an angle to a floor, at upper reaches of an area, etc.

Further, the device and method may be portable to be used at a variety of different training facilities. The device can be shared by various different personnel. The portability and adaptability of the system would provide for a cost-effective training method for teaching a large number of trainees.

SUMMARY

The present invention is directed to a device and method for training persons to remain within a safety zone. A safety zone is established by one or more signals. Additionally, walls and floors of the testing location may further be used to establish the boundaries of the safety zone. One or more persons are positioned within the safety zone. In one embodiment, the persons are instructed to perform various training exercises. The training continues as the person or persons remain within the safety zone. If the persons exits the safety zone, an alarm is activated.

DETAILED DESCRIPTION

Figure 1:
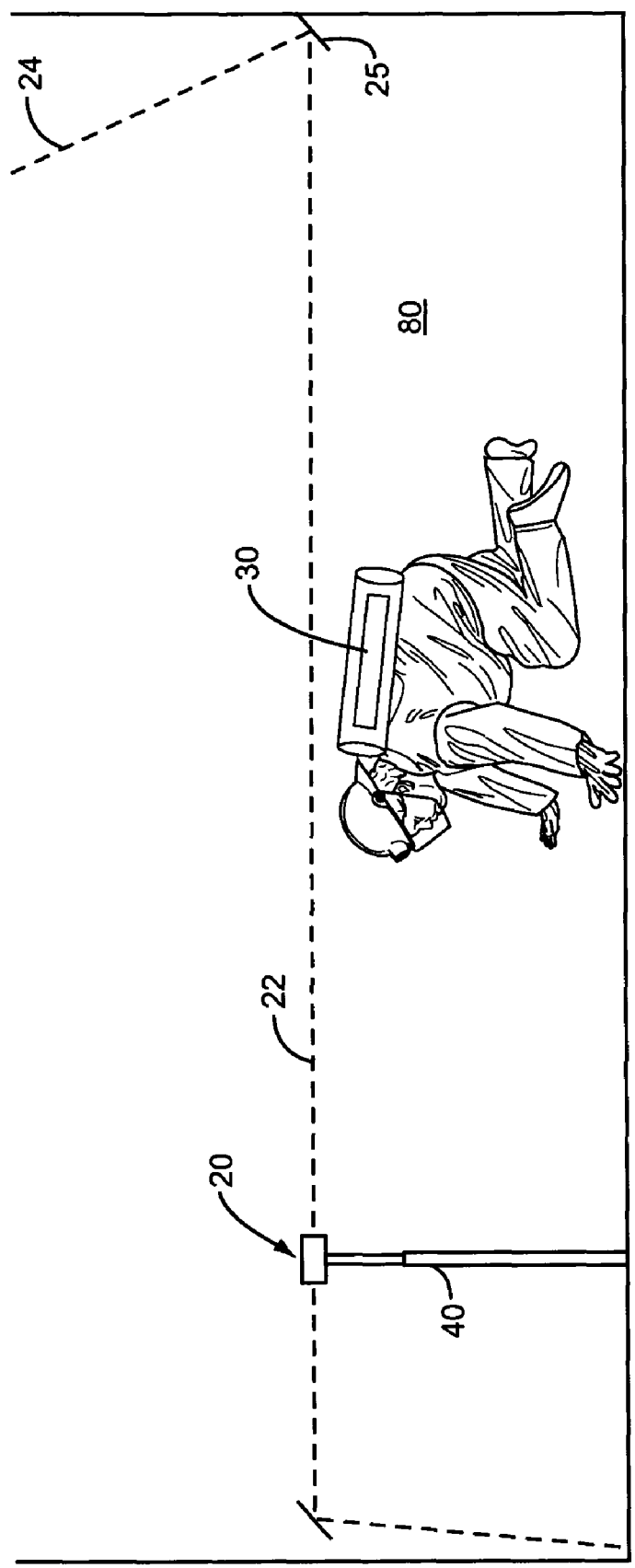
FIG. 1 is a side view of one embodiment of a trainee within a safety zone.

The present invention is directed to a method and device for teaching trainees to remain within a safety zone. As illustrated in FIG. 1, the device includes an emitter 20 that establishes a safety zone 80 that is not to be exceeded by the trainee. An adjuster 40 operatively connected to the emitter 20 adjusts the size and position of the safety zone 80. A sensor 30 is placed away from the emitter 20, such as on the trainee, to indicate when the trainee moves outside of the safety zone 80.

Figure 3:
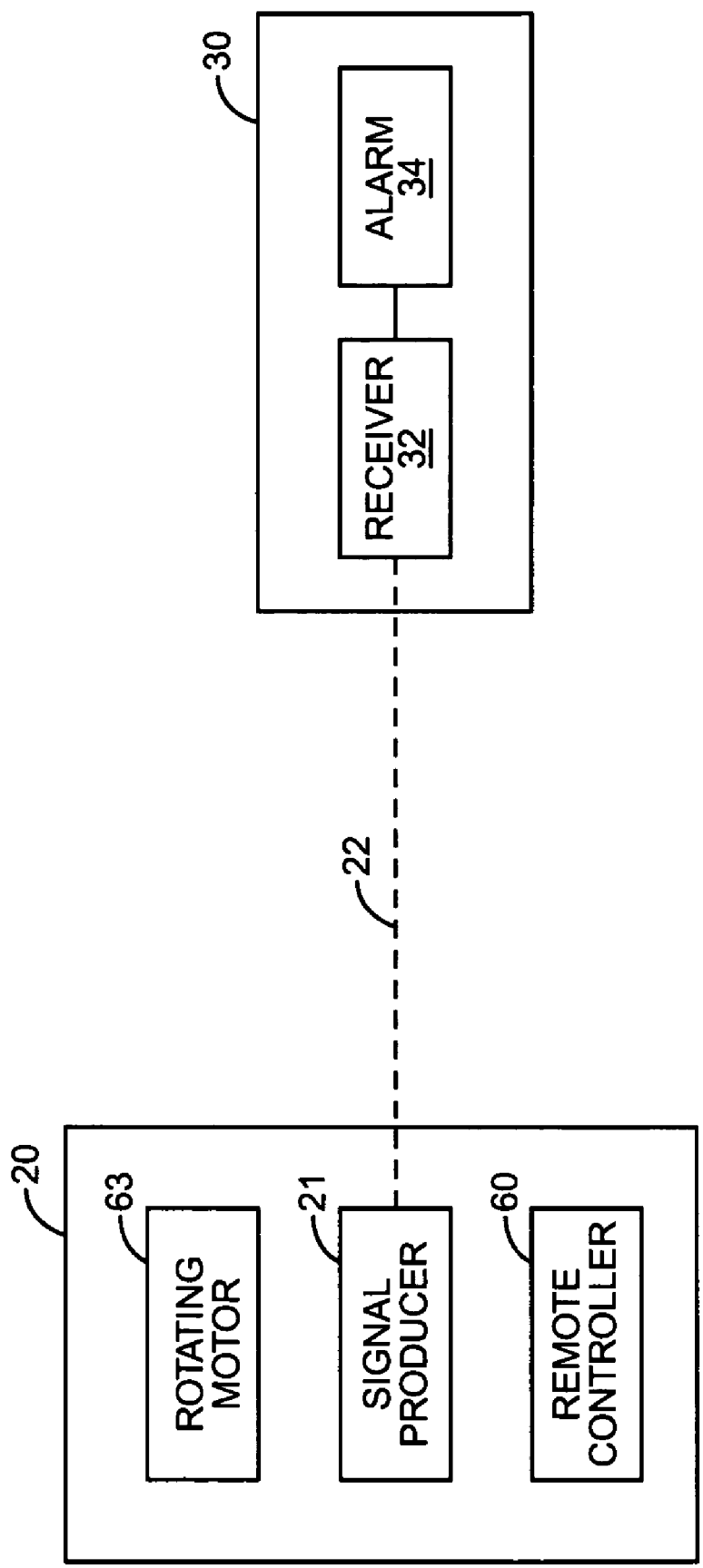
FIG. 3 is a schematic diagram of an emitter and sensor constructed according to one embodiment of the present invention.

The emitter 20 transmits a signal 22 that establishes at least one boundary of the safety zone 80. As illustrated in FIG. 3, emitter 20 includes a signal generator 21 that generates the signal 22. Signal generator 21 is configured to generate signal 22 as a transmitted electromagnetic or acoustical signal that can be used to activate a corresponding sensor 30 that is configured to detect signal 22. The emitter 20/sensor 30 combination may be optical, magnetic, capacity, radiofrequency, ultrasonic, etc.

Emitter 20 can be configured as a rotating or oscillating "emitter head" such that signal 22 is emitted over a desired range of angles. A motor 63 provides for rotating or oscillating the emitter 20. By way of non-limiting example, emitter 20 can be configured to rotate around a vertical axis such that signal 22 is emitted over a desired angular range of a horizontal detection plane, e.g., 360°. Of course, the axis of rotation of emitter 20 can be varied to form vertical detection planes or detection planes at off-horizontal and off-vertical angles as needed or desired, and multiple emitters 20 can be used to establish multiple detection planes.

Thus, in an exemplary embodiment, emitter 20 is positioned on adjuster 40 at a desired height above a floor, for example, and then activated such that it transmits signal 22 over a 360° range, thereby forming a detection plane at a desired height above the floor. A trainee, such as a firefighter trainee, wearing a sensor 30 on his or her back would thus avoid "tripping" an alarm by staying below the height of the detection plane as defined by signal 22. To facilitate setting the detection plane height, adjuster 40 may be marked with preset heights and/or emitter 20 can be programmed to move to preset or default positions along the length of adjuster 40. In general, adjuster 40 can be marked in units of distance, e.g., inches/feet and/or centimeters/meters, to facilitate the positioning of emitter 20 along the length of adjuster 40.

In one embodiment, then, emitter 20 includes at least one optical emitter, such as a laser diode or high-intensity LED. A laser diode offers the advantage of narrower beam angles and the ability to use collimating lenses for generation of a tightly focused signal 22, with the attendant advantage of providing higher optical power levels to sensors 30 at greater distances from emitter 20 than would be provided by the typical LED. However, so-called "focused" or high-intensity LEDs are commonly available and offer good detection performance out to reasonable distances from emitter 20. The use of LEDs for signal generator 21 offer the further advantages of inherent eye safety, cheaper cost, lower power, and longer life as compared to using true laser diodes. Note that even with use of a laser diode, rotating the emitter 20 and/or pulsing signal generator 21 ensures eye safety with respect to radiated emissions from emitter 20.

As an alternative to rotating emitter 20, signal generator 21 can comprise an array of emitters that are arrayed over a desired angular sector. For example, signal generator 21 might comprise a plurality of optical emitters positioned at 10° angular increments, or at some other desired angular resolution. Whether emitter 20 is fixed or rotating, the optical emitters used in signal generator 21 may operate in visible or non-visible bandwidths. For example, signal generator 21 may operate in the infrared wavelengths, which may offer lower absorption of signal 22 if training is conducted in simulated fire conditions, e.g., smoke, fog, etc.

Regardless, sensor 30 may be configured to include one or more complementary optical sensors to sense signal 22, such as photovoltaic sensors, photodiodes, phototransistors, etc. The particular selection of sensor type may be matched according to the selected configuration of signal generator 21, e.g., the wavelength of signal 22, the expected range of received optical power, etc. In an exemplary embodiment, sensor 30 comprises one or more arrays of optical sensors, such as a plurality of photodiodes. Thus, by mounting one or more sensors 30 to a trainee, or to the trainee's equipment, the trainee may assume a crawling or crouched position below the height of a detection plane established by signal 22, and one or more sensors 30 mounted to the trainee or to the trainee's equipment thus can be used to detect when the trainee violates the detection plane based on one or more of trainee's sensors 30 breaking the detection plane.

The idea can be varied by, for example, mounting one or more sensors 30 not on the trainee but rather on a wall or other structure. The detection logic thus can be altered such that receipt of signal 22 is the non-alarm (normal) condition. With that logic, an alarm condition is generated if the trainee moves into a position that obscures signal 22, i.e., blocks one or more sensors 30 from receiving signal 22. Those skilled in the art will appreciate that variety of detection methods that can be employed depending on the number and arrangement of sensors 30, and the number and arrangement of emitters 20.

Redirecting elements 25 may be placed to redirect the signal 22 and extend the extent of the safety zone 80. The redirecting elements 25 are spaced away from the emitter 20 as illustrated in FIG. 1. The redirecting elements 25 allow for the safety zone 80 to be extended into adjacent rooms where the signal 22 may not be able to directly cover because of blockage by walls, foreign objects, and the like. Additionally, the redirecting elements 25 may redirect the signal 22 back towards the emitter 20. This prevents a trainee from cheating the system by blocking the original signal 22 with their body or other foreign object to prevent activation of the sensor 30. The redirected signal 24 rebounds towards the trainee at a different angle that makes it difficult to block both the original and rebound signal. Further, redirecting element 25 may redirect the signal 22 to form more than one boundary. As illustrated in FIG. 1, redirecting element 25 causes the redirected signal 24 to form a vertical boundary substantially perpendicular to the floor in addition to the original boundary that is substantially parallel with the floor. In one embodiment, redirecting element 25 is a mirror.

Figure 4:
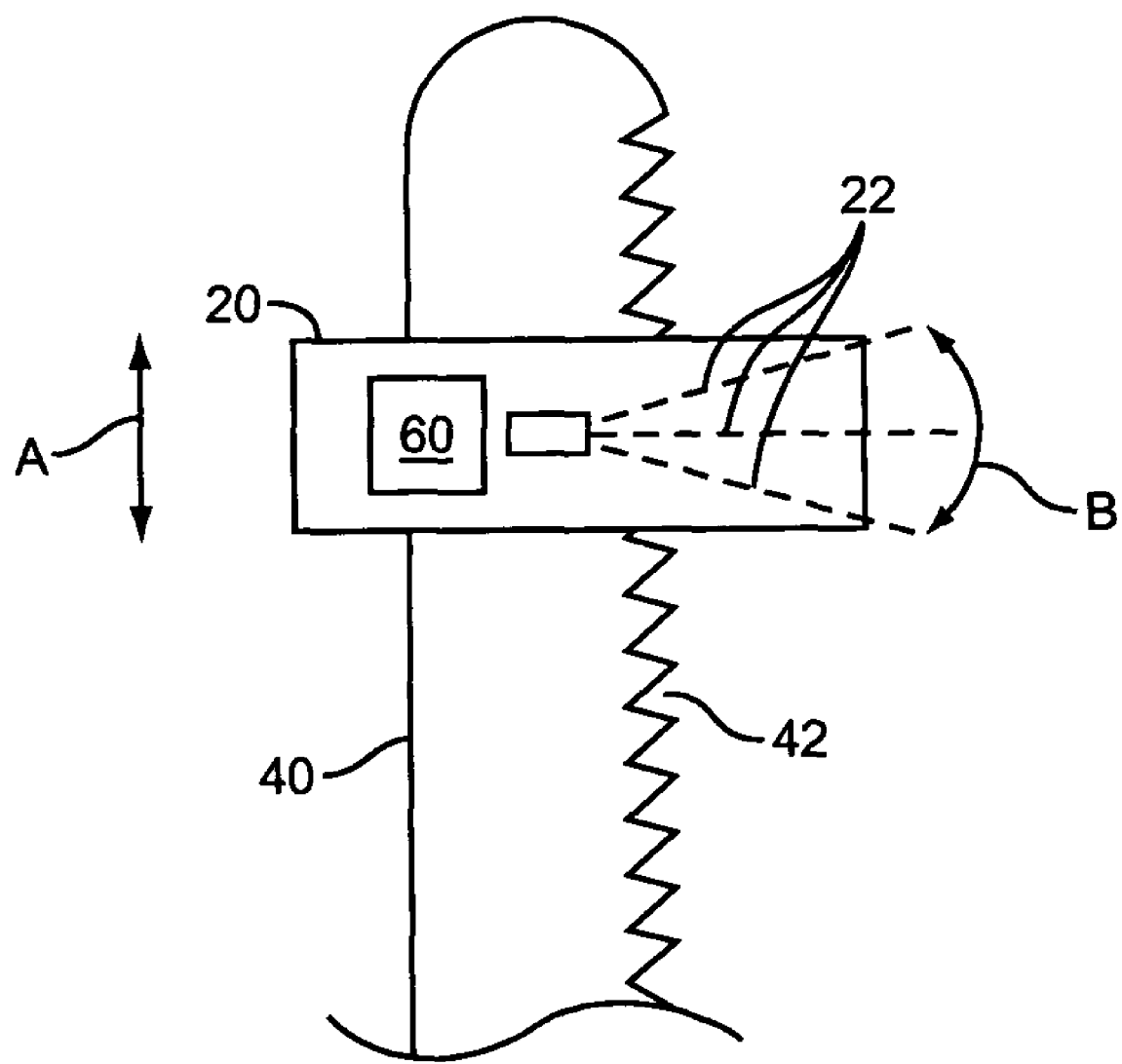
FIG. 4 is a partial side view of the emitter mounted on an adjuster according to one embodiment of the present invention.

The adjuster 40 supports and positions the emitter 20. In one embodiment, adjuster 40 establishes the vertical position of the emitter 20 and the safety zone 80 is set at a predetermined vertical height above the floor. Adjustment of the emitter 20 changes the dimensions of the safety zone 80. In one embodiment as illustrated in FIG. 4, adjuster 40 includes supports 42 that mate with the emitter 20 to adjust the position and/or orientation of the emitter 20. The emitter 20 is positioned along the supports 42 for adjustment along the length of the adjuster 40 along direction indicated by arrow A, and also the angular adjustment indicated by arrow B. In one embodiment, a rack and pinion structure is used for adjusting the emitter 20 relative to the adjuster 40.

A remote control unit 60 may also be positioned within the emitter 20 to remotely adjust the position. A facilitator positioned away from the emitter 20 or away from the safety zone 80 may adjust the position of the emitter 20 during the training exercise. The remote control unit 60 may function using radio signals, infra-red signals, or other remote means.

Figure 6:
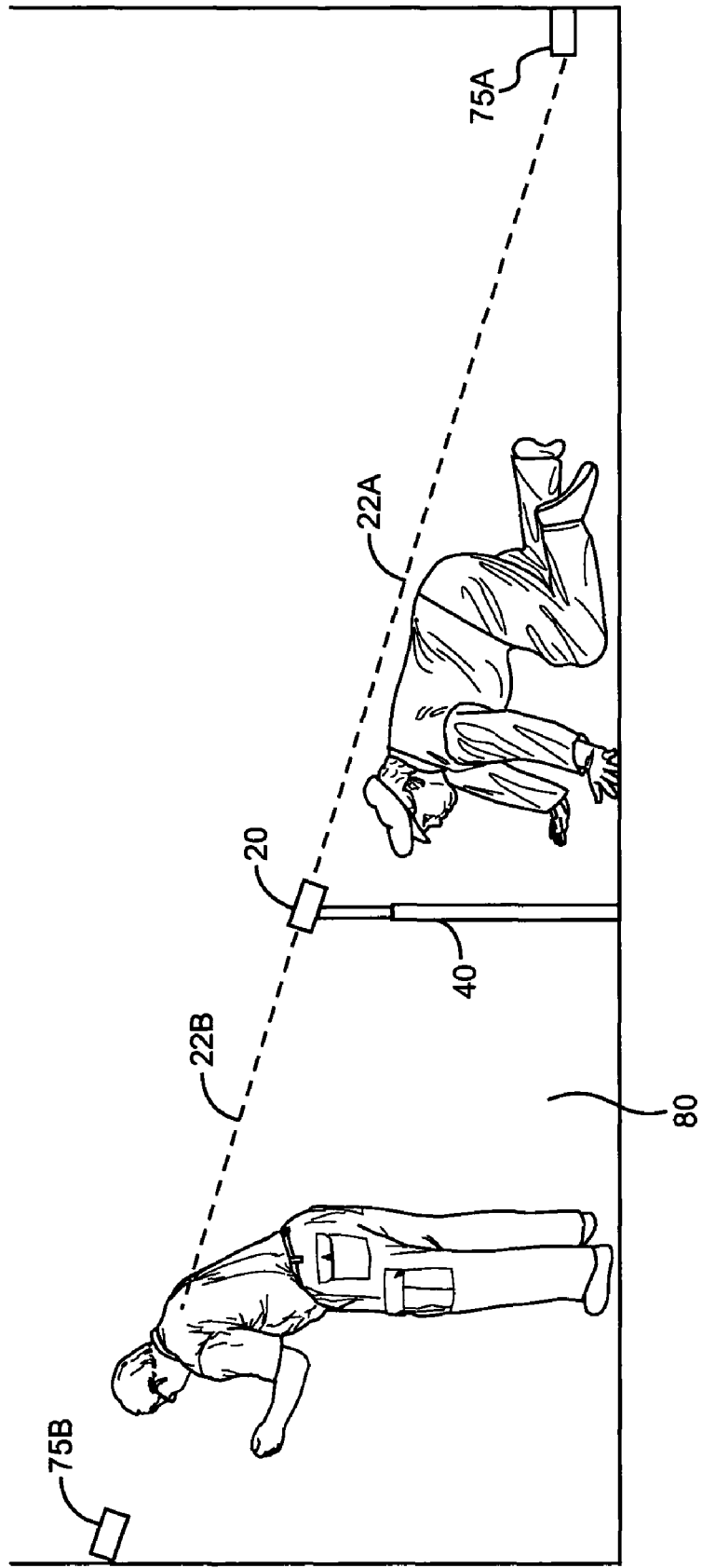
FIG. 6 is a side view of another embodiment having one or more receivers distanced from the emitter.

The method may include establishing safety zones 80 of various sizes and dimensions depending upon the training technique. In one embodiment as illustrated in FIG. 1, the emitter 20 directs a signal 22 that forms the first boundaries of the safety zone 80. The other boundaries are established by the walls and floor of the testing location. In another embodiment, multiple emitters 20 are used for establishing the one or more boundaries. Each emitter 20 may establish a different boundary line, or, multiple emitters 20 may be aligned a distance apart that combine to form a boundary line. The emitter 20 may be placed at a variety of positions within the training area. In the embodiment of FIG. 1, the emitter 20 is centrally located within the training area to ensure the signal 22 reaches the vertical walls. In other embodiments, the emitter 20 may be placed away from the training area to prevent accidental contact by one of the trainees. The signal 22 may be positioned to have a substantially uniform safety zone 80 as illustrated in FIG. 1, or an angled safety zone 80 as illustrated in FIG. 6. The safety zone 80 can be positioned at various vertical or horizontal positions as desired by the facilitator.

Sensor 30 is positioned a distance from the emitter 20 and receives the signal 22 when the trainee moves from the safety zone 80. FIG. 3 indicates one embodiment of the sensor 30 having a receiver 32 for receiving the signal 22, and an alarm 34. As noted previously, each sensor 30 may comprise one or more sensor elements. Thus, receiver 32 may, for example, comprise a plurality of sensing elements configured to detect signal 22. By way of non-limiting example, receiver 32 thus may comprise one or more photovoltaic cells, phototransistors, or photodiodes. Receiver 32 may include signal amplification, level shifting and/or filtering as needed or desired to provide the desired sensitivity. The spectral sensitivity of the sensors used in receiver 32 may be selected to reduce interference from ambient light. For increased resistance to false detection, receiver 32 can be configured to respond to a modulated signal 22 by using, for example, band pass or other frequency response filtering to detect a particular modulation frequency of signal 22.

Figure 2:
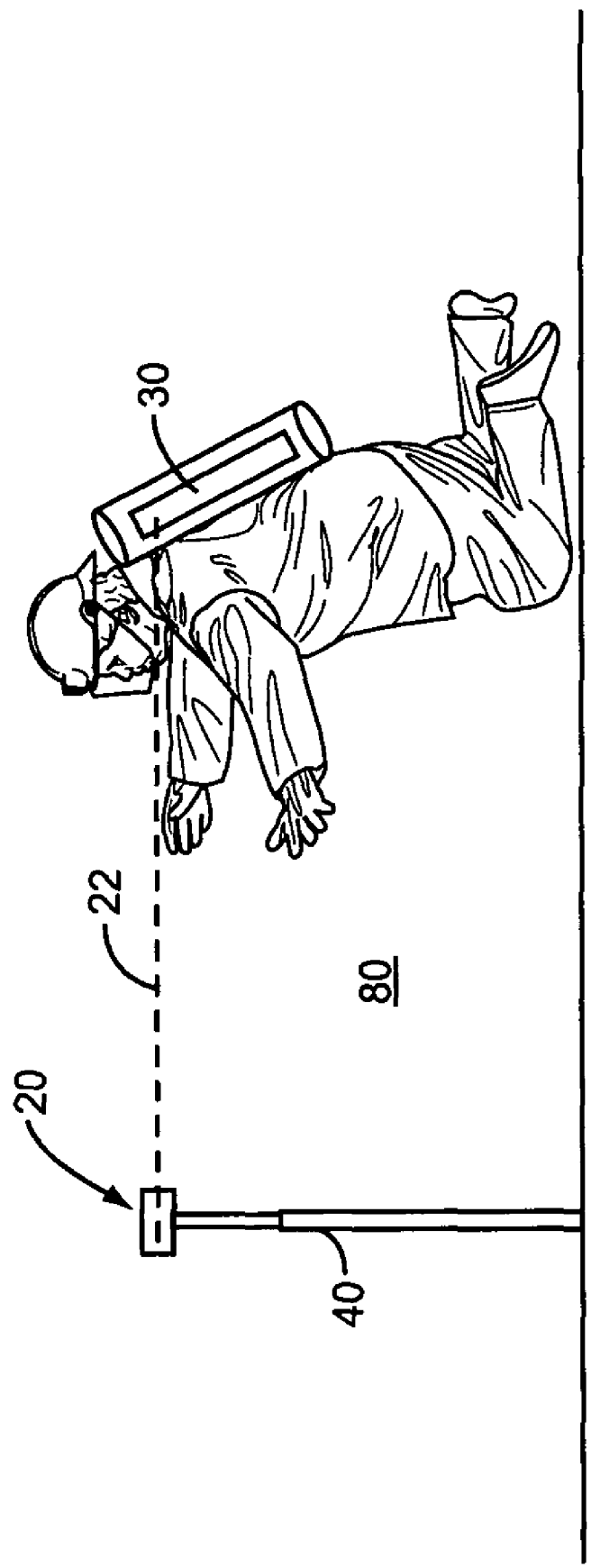
FIG. 2 is a side view of one embodiment with the trainee moving beyond the safety zone and causing a sensor to activate.

Regardless, sensor 30 is configured to respond to the presence (or absence) of signal 22 such that the alarm 34 can be made responsive to the detection state of sensor 30. In that role, the alarm 34 is operatively connected to the receiver 32 and notifies the trainee that they have moved out of the safety zone 80. Various types of alarms 34 may be used including by way of example an audible alarm that is heard by at least the trainee, or a vibrating alarm that can be felt by the trainee. The alarm 34 may be detected by the trainee, by the facilitator, or both. The alarm 34 may have a variety of settings once it has been activated including deactivating once the signal 22 is no longer detected by the receiver 32 (i.e., when the trainee has moved away from the signal 22), remaining activated for a predetermine time after the signal 22 is no longer detected, or remaining activated indefinitely until positively deactivated by the trainee or facilitator. FIG. 2 illustrates one embodiment in which the trainee has moved from the safety zone 80 and the sensor 30 detects the signal 22.

In one embodiment, alarm 34 is removed from the sensor 30. The alarm 34 may be remotely located with the facilitator so the facilitator can detect when the safety zone 80 is violated, but not necessarily the trainee. An alarm 34 may be associated with each sensor 30, or multiple sensors 30 can activate a common alarm 34. The link between the sensor 30 and alarm 34 may be RF-based.

Sensor 30 may be positioned at a variety of locations on the trainee. As illustrated in FIG. 1, the sensor 30 is positioned on the equipment worn by the trainee, such as an air tank similar to that worn on the backs of fire personnel. Various other positions may also be used including headgear, clothing, footwear, etc. The size and number of sensors 30 on each trainee may vary depending upon the training method. In one embodiment, a plurality of sensors are positioned on different sections of the trainee (e.g., the head area and the torso area) to ensure that no part of their body or equipment interferes with the signal 22. The sensors 30 may also be positioned to face different directions to ensure the trainee cannot turn their sensor 30 away from the emitter 20 and thus prevent activation of the alarm 34. In another embodiment, a single sensor 30 is worn.

Figure 5:
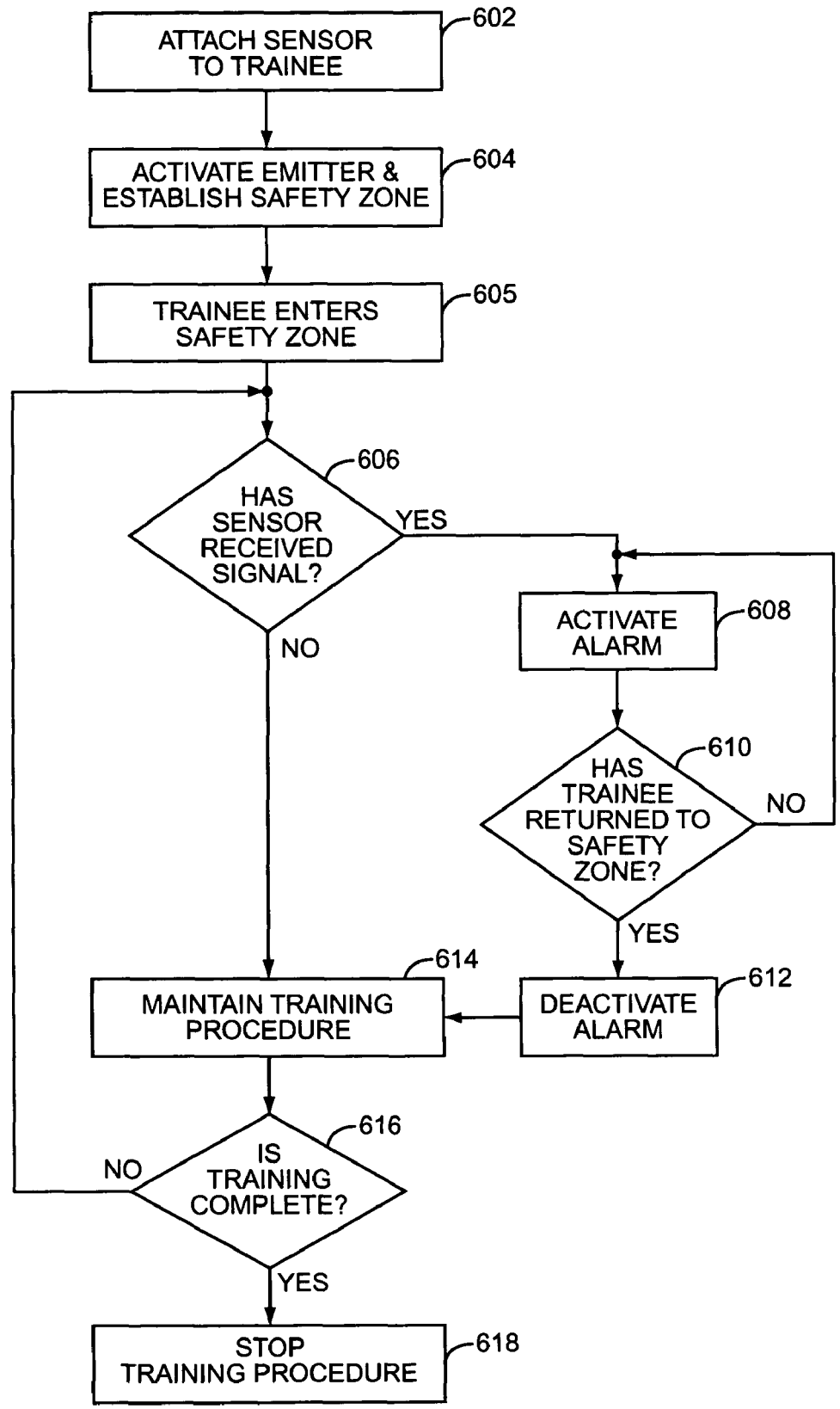
FIG. 5 is a flow diagram illustrating the steps of the method of the present invention according to one embodiment.

FIG. 5 illustrates the steps of using the training method according to one embodiment. One or more sensors 30 are attached to the trainee and/or their equipment (step 602). The safety zone 80 is established by positioning the emitter 20 at the desired position and orientation and activating the emitter (step 604). The trainee then begins the training method and enters the safety zone 80 (step 605). The trainee performs various maneuvers and movements as required by the facilitator. The alarm 34 remains deactivated provided the trainee remains within the safety zone 80 established by the signal 22 such as the position indicated in FIG. 1. The trainee may be blindfolded or otherwise hindered to make the training method more lifelike, such as to represent the conditions that a fire personnel would encounter upon entering a burning building and having zero visibility, or of a police officer entering a dark building.

The sensor 30 remains active and senses any movement of the trainee that places the sensor 30 within a position to receive the signal 22 (step 606). This position may require the sensor 30 to break through the location of the signal 22, or merely come within proximity to the signal 22. Once the sensor 30 has received the signal 22, the alarm 34 is activated (step 608). Activation of the alarm 34 may be signaled to one or more of the trainee, other trainees, and the facilitator. FIG. 2 illustrates one embodiment of the trainee exiting the safety zone 80 and the sensor 30 sensing the signal 22 causing activation of the alarm 34.

In the embodiment of FIG. 5, the sensor 30 is designed for the alarm 34 to deactivate once the training has returned to the safety zone (steps 610 and 612). Other embodiments may include the alarm 34 remaining activated for an extended period of time.

The alarm 34 remains deactivated as the trainee remains within the safety zone 80 and the training method continues (step 614). As the testing continues, the sensor 30 monitors the position of the trainee to ensure he or she remains within the safety zone (step 616). Once the training procedure is complete, the sensor 30 and emitter 20 can be deactivated (step 618).

In the embodiments described above, the sensor 30 is worn by the trainee. FIG. 6 illustrates another embodiment having one or more receivers 75A, 75B aligned across the safety zone 80 from the emitter 20. The signal 22A, 22B passes from the emitter 20 and is received by the receiver(s) 75A, 75B when the trainee maintains proper position within the safety zone 80. When the trainee breaks the safety zone 80, the signal 22A, 22B is not received by the receiver(s) 75A, 75B which results in an indicator being sounded or otherwise signaled.

The present invention may be carried out in other specific ways than those herein set forth without departing from the scope and essential characteristics of the invention. In one embodiment, two or more emitters 20 are positioned to create the safety zone 80. The multiple emitters 20 may be operatively connected together, or may be separate and independent units. In another embodiment, the safety zone is designed for monitoring the location of children. The alarm remains deactivated when the children remain within the safety zone 80, but activates at the time when a child leaves the safety zone 80. The present embodiments are, therefore, to be considered in all respects as illustrative and not restrictive, and all changes coming within the meaning and equivalency range of the appended claims are intended to be embraced therein.

What is claimed is:

1. A system for training firefighters to remain below a heat critical vertical boundary, the system comprising:
    an emitter configured to establish a height limit, the emitter emitting a single signal;
    a vertical support member adapted to establish the height limit at the vertical boundary; and
    a wearable sensor configured to emit an alarm signal responsive to its intrusion above the vertical boundary, the sensor positioned to face towards the emitter when the firefighter is in a crawling or prone position;
    wherein the emitter is adapted to turn 360° about the vertical support member to establish the vertical boundary around a 360° axis to replicate a heat critical vertical boundary to train firefighters;
    the emitter and the vertical support configured to steadily move the vertical boundary downward while the emitter is rotating during a training exercise from a first vertical level to a lower second vertical level to replicate movement of the heat critical vertical boundary caused by smoke and heat that accumulates during a fire.

2. The system of claim 1, further comprising an adjustment mechanism to selectively position the emitter at selected vertical positions.

3. The system of claim 2, wherein the adjustment mechanism is configured to selectively position the emitter at selected angular positions.

4. The system of claim 1, wherein the emitter further comprises a receiver that receives signals from a remote control unit to remotely adjust the position of the emitter on the vertical support member.

5. The system of claim 1, wherein the sensor further includes a speaker to emit an audible sound responsive to intrusion above the height limit.

6. A method for training firefighters to remain below a heat critical vertical boundary, the system comprising:
    attaching an emitter that emits a signal in one direction to a vertical support member;
    rotating the emitter through 360° about the vertical support member with the signal forming a substantially continuous signal at the vertical boundary to replicate a heat critical vertical boundary;
    replicating an accumulation of smoke and heat that occurs during a fire and moving the rotating emitter downward and thereby also moving the vertical boundary downward and reducing a size of a safety zone formed vertically below the vertical boundary; and
    providing a wearable sensor positioned to face towards the emitter when the firefighter is in a crawling or prone position, the sensor configured to emit an alarm signal responsive to its intrusion out of the safety zone and above the vertical boundary to indicate that the firefighter has moved to an unsafe position above the heat critical vertical boundary.

7. The method of claim 6, wherein the step of defining the height limit at the vertical boundary comprises establishing the height limit at an angle relative to a floor upon which the firefighter is positioned.

8. The method of claim 6, further comprising configuring the wearable sensor to emit an audible alarm signal responsive to its intrusion above the height limit.

9. The method of claim 6, further comprising configuring the wearable sensor to stop emitting the alarm signal when the sensor is positioned back below the height limit.

10. A method for training firefighters to remain below a heat critical vertical boundary, the system comprising:

positioning in a room an emitter that emits a signal in one direction;

creating a boundary at a first vertical distance above a floor of the room by rotating the emitter through 360° with the signal forming a substantially continuous signal, the boundary at the first vertical distance above the floor replicating a heat critical boundary at a first stage of a fire caused by smoke and heat in the room;

continuously lowering the rotating emitter and the boundary towards the floor of the room below the first vertical distance and replicating the accumulation of the smoke and heat that build up in the room at later stages of the fire; and providing a wearable sensor positioned to face towards the emitter when the firefighter is in a crawling or prone position, the sensor configured to emit an alarm signal responsive to its intrusion above the boundary to indicate that the firefighter has moved to an unsafe position that occurs during the fire.

* * * * *